United States Patent [19]
Wood

[11] Patent Number: 5,680,913
[45] Date of Patent: Oct. 28, 1997

[54] SNUBBER FOR A HYDRAULIC MOTOR

[75] Inventor: Trevor J. Wood, Joliet, Ill.

[73] Assignee: Caterpillar Inc., Peoria, Ill.

[21] Appl. No.: 755,519

[22] Filed: Nov. 22, 1996

[51] Int. Cl.$^6$ .................. F16F 9/48; F15B 15/22
[52] U.S. Cl. .................. 188/285; 188/312; 188/289; 91/406; 91/407; 92/85 B
[58] Field of Search .................. 188/280, 282, 188/285, 287, 289, 300, 312, 313, 318, 319; 267/64.12, 114, 125, 126, 137; 92/85 B, 143; 91/395, 406, 407, 408, 409

[56] References Cited

U.S. PATENT DOCUMENTS

| | | | |
|---|---|---|---|
| 1,902,018 | 3/1933 | Davis | 91/395 |
| 1,910,644 | 5/1933 | Smith | 91/395 |
| 2,299,345 | 10/1942 | Peterson | 91/395 |
| 2,329,145 | 9/1943 | Stuebing, Jr. | 188/289 |
| 2,778,343 | 1/1957 | Crosetto, Jr. | 91/407 |
| 3,574,886 | 4/1971 | Solovieff | 188/280 |
| 3,608,437 | 9/1971 | Little et al. | 91/407 |
| 3,877,344 | 4/1975 | Langland | 91/407 |
| 4,015,835 | 4/1977 | Schumacher et al. | 188/287 |
| 4,250,793 | 2/1981 | Berg | 188/287 |
| 5,413,030 | 5/1995 | Richardson et al. | 92/85 B |

*Primary Examiner*—Robert J. Oberleitner
*Assistant Examiner*—Chris Schwartz
*Attorney, Agent, or Firm*—Calvin E. Glastetter

[57] ABSTRACT

Snubbers are useful in dampening inertia loads at the end of stroke movement of a hydraulic motor. Known snubbers usually have a spear type annular orifice with an associated plunger which usually restrict fluid flow in the non-snubbing mode thereby slowing response in the opposite direction. The subject snubber includes a snubber stem which is moved to contact the end of a tubular hydraulic cylinder so that all fluid from an actuating chamber must pass through a circular orifice which will build up pressure in the actuating chamber to provide a dampening effect on a piston rod assembly. When fluid is directed into the actuating chamber the snubber stem will move away from the end of the tubular hydraulic cylinder to allow free flow into the actuating chamber to provide quick response for extension of the piston rod assembly.

9 Claims, 2 Drawing Sheets

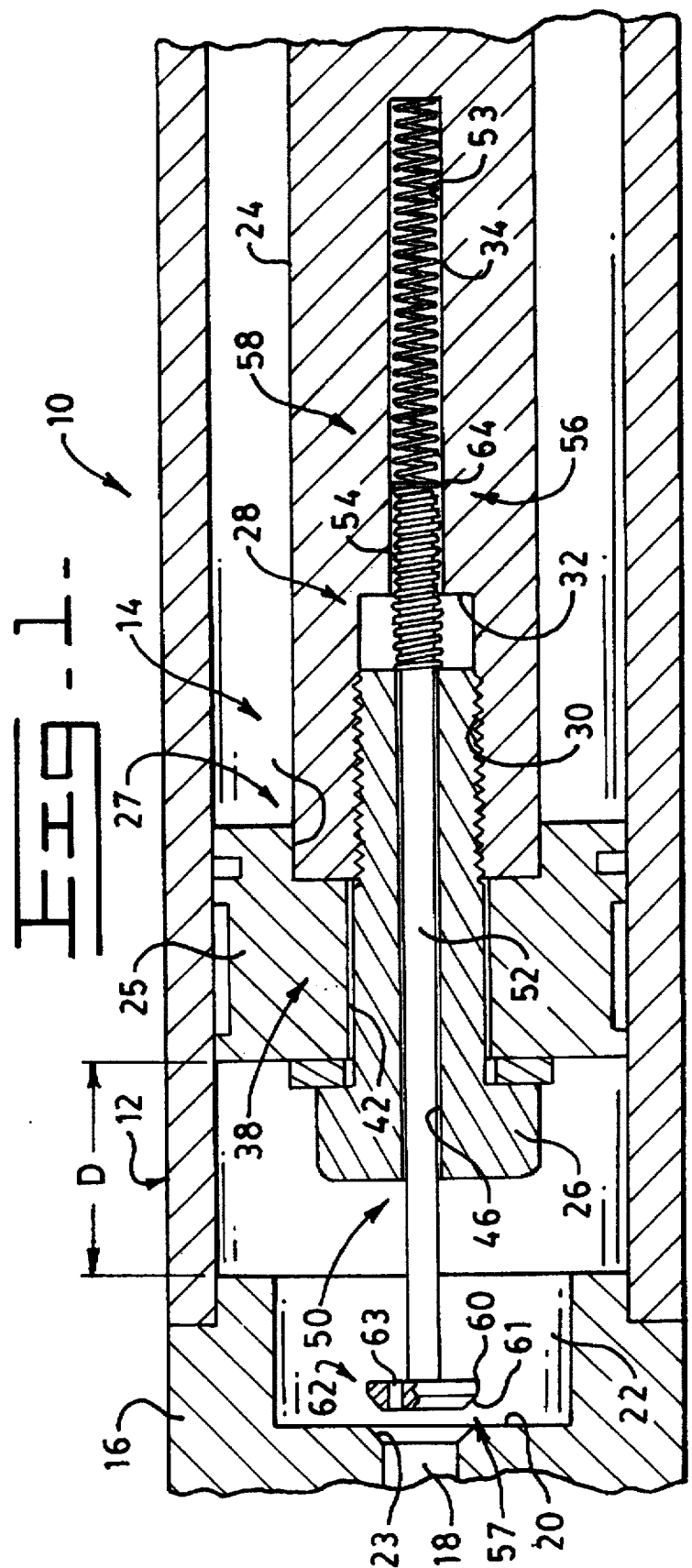

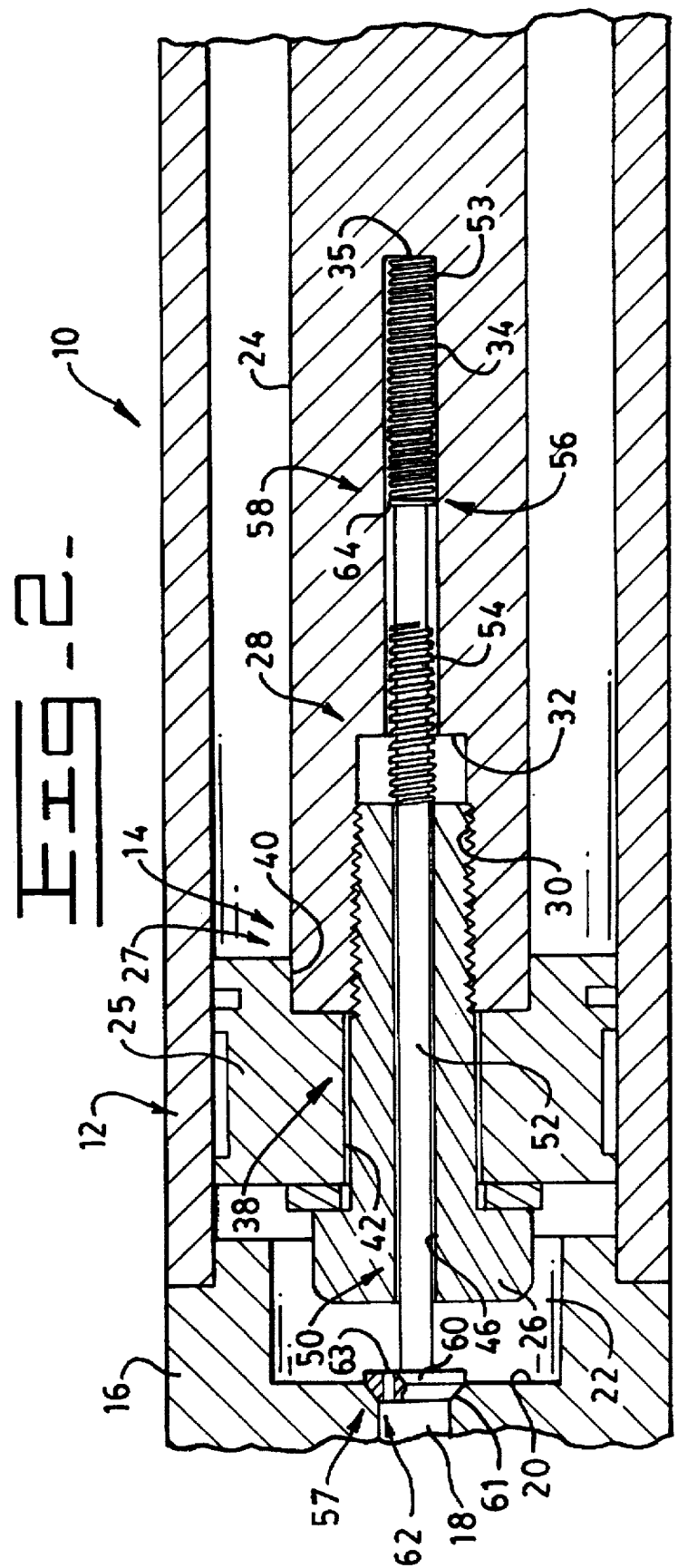

5,680,913

SNUBBER FOR A HYDRAULIC MOTOR

TECHNICAL FIELD

This invention relates to a linear hydraulic motor and more particularly to a cushioning device or snubber for dampening a piston of the hydraulic motor at the end of stroke movement.

BACKGROUND ART

Linear hydraulic motors or hydraulic cylinders are commonly used for moving one member relative to another member. Serious problems can be encountered in the operation of the hydraulic motor as a result of impact of the piston rod assembly against the end of the hydraulic motor. The impacts can disturb work being performed, make undesirable noise and cause damage to the hydraulic motor or associated components if sizable shock forces are generated. To reduce or eliminate such shock forces hydraulic motors have been equipped with end of stroke cushioning or dampening devices which act to restrict fluid flow from the hydraulic motor as the piston rod assembly approaches the end of its stroke travel.

As previously constructed the dampening or cushioning devices normally includes spear type restrictive devices having a plunger which enters a cavity to form a restrictive orifice a predetermined distance before the piston rod assembly reaches its end of stroke travel. The restrictive orifice restricted the fluid flow from the actuating chamber through a fluid passage until the end of the stroke is reached. One of the problems encountered with such restrictive device was if the plunger and the cavity had any misalignment, from machining or forces on the hydraulic motor, the plunger would have eccentricity with the cavity and would not function as intended and would have inconsistent cushioning from one time to another. Another problem encountered with such restrictive device is that it also restricts the fluid flow entering the actuating chamber until the plunger separates from the cavity. Such restriction slows the response of the piston rod assembly in the opposite direction.

It would be desirable to provide a snubber or cushioning device having consistent dampening or cushioning capabilities at the end of stroke of the hydraulic cylinder but allow unrestricted fluid flow into the actuating chamber so that no delay is present when actuating the motor in the reverse direction.

The present invention is directed to overcoming one or more of the problems as set forth above.

DISCLOSURE OF THE INVENTION

In one aspect of the present invention, a snubber is provided for a hydraulic motor having a cylinder with an actuating chamber adjacent an end of the cylinder having a fluid passage therein for transmitting fluid into and out of the actuating chamber. The snubber includes a piston rod assembly reciprocatably mounted within the cylinder and includes an axial bore. A snubber stem reciprocates within the axial bore of the piston rod assembly and extends a predetermined distance into the actuating chamber. The snubber stem has a first operative position wherein the snubber is spaced from the end of the cylinder and a second operative position wherein the snubber stem is in contact with the end of the cylinder. A first spring resiliently biases the snubber stem toward the end of the cylinder. A second spring resiliently positions the snubber stem the predetermined distance into the actuating chamber by resisting the biasing force of the first spring. A flow restricting passage means in the snubber stem is provided for communicating the actuating chamber with the fluid passage in the end of the cylinder when the snubber stem is in the second operative position to dampen the end of stroke movement of the piston rod assembly.

BRIEF DESCRIPTION OF THE DRAWINGS

FIG. 1 is a cross sectional view of a hydraulic motor showing the snubber assembly spaced from the end of the cylinder.

FIG. 2 is a cross sectional view of the hydraulic motor showing the snubber assembly in contact with the end of the cylinder.

BEST MODE FOR CARRYING OUT THE INVENTION

A telescopic hydraulic motor 10 includes a tubular hydraulic cylinder 12 and a piston rod assembly 14 reciprocatably disposed within the tubular hydraulic cylinder 12.

The tubular hydraulic cylinder 12 includes an end portion 16 having a fluid passage 18 for introducing fluid into and exhausting fluid from within the tubular hydraulic cylinder 12. The end portion 16 has a surface 20 spaced from the piston rod assembly 14 to define a variable volume actuating chamber 22. The surface 20 has a tapered seat 23 for the opening of the fluid passage 18.

The piston rod assembly 14 includes a piston rod 24, a piston 25 and a bolt 26. The piston rod 24 has an end portion 27 with a stepped bore 28 axially formed therein. The stepped bore 28 includes a threaded first bore 30 having an end surface 32 and a second smaller bore 34 extending from the end surface 32 into the piston rod 24 and has an end surface 35. The piston 25 includes a stepped bore 38 having a first bore 40 for receiving the end portion 27 of the piston rod 24 and a second bore 42. The bolt 26 passes through the stepped bore 38 in the piston 36 and is threadably fastened to the threaded first bore 30 in the piston rod 24. The bolt 26 has an axial bore 46 which is in axial alignment with the stepped bores 28,38 and the fluid passage 18. The piston rod assembly 14 could be formed by a piston welded to the piston rod or by a piston rod alone not including the bolt. All that is required is that a bore is provided for receiving the snubber assembly and a stop for the limiter spring to contact for limiting movement of the snubber stem toward the end of the cylinder.

A snubber assembly 50 includes a snubber stem 52, a first or extender spring 53, a second or tension limiter spring 54 and a stop means 56. The snubber assembly 50 is axially reciprocatably positioned within the bore 46 of the bolt 26 and the bore 34 in the piston rod 24. The snubber stem 52 has a first end portion 57 which extends a predetermined distance into the actuating chamber 22 when the piston 25 is spaced from the end surface 20 greater than a predetermined distance D as shown in FIG. 1. The snubber stem 52 has a first operative position wherein the stem is spaced from the end 16 which allows for unrestricted fluid flow through the fluid passage 18, as shown in FIG. 1, and a second operative position wherein the snubber stem is in contact with the end 16 which restricts the fluid flow into the fluid passage 18, as shown in FIG. 2. The snubber stem 52 has a second end portion 58 reciprocatably positioned in the bore 34. The first end portion 57 has an enlarged circular flange 60 having a tapered surface 61 which interacts with the tapered seat 23 in the end portion 16 of the tubular hydraulic cylinder 12. A flow restricting passage means 62 such as a circular orifice 63 extends axially through the circular flange 60 for providing fluid communication from the actuating chamber 22 to the fluid passage 18 when flange 60 is in contact with the end portion 16 as shown in FIG. 2. The flow restricting passage means 62 can be any shape or size without departing from the scope of the invention. The second end portion 58 includes the stop means 56 such as a snap ring 64 suitably connected to the second end portion 56. In this example the stop means 56 is shown as a snap ring, however other means such as a pin or welded ring could be used without departing from the scope of the invention. The extender spring 53 is positioned around the snubber stem 52 within the bore 34. The extender spring is contained between the snap ring 64 and the end surface 35 of the bore 34 for biasing the snubber stem 52 into the actuating chamber 22. The tension limiter spring 54 is positioned around the snubber stem 52 between the snap ring 64 and the bolt 26 to stop the movement of the snubber stem 52 at the predetermined distance into the actuating chamber 22.

INDUSTRIAL APPLICABILITY

In operation, retracting the piston rod assembly 14 is accomplished by venting the hydraulic fluid in the actuating chamber 22, on one side of the piston 25, through the passage 18 to a fluid source (not shown) while pressurized fluid from the source is directed into the tubular cylinder 12, on the other side of the piston 25, in any suitable manner. It will be understood that the hydraulic motor in many cases supports a load such that gravitational or other forces can cause the piston rod assembly 14 to move toward the end surface quite rapidly thereby generating high inertia loads.

The snubber stem 52 is normally resiliently biased to the first operative position shown in FIG. 1 by the extender spring 53 when the piston is spaced from the end surface 20 at or greater than the predetermined distance D. Further extension of the snubber stem 52 is normally restricted by the snap ring 64 contacting the tension limiter spring 54. When the hydraulic motor 12 is being retracted, the fluid exhausted from the actuating chamber 22 passes into the passage 18 at its substantially unrestricted flow rate when the snubber stem 52 is at the first operative position. When the piston 25 reaches the predetermined distance D, the enlarged flange 60 restricts the flow rate and produces a pressure differential between the actuating chamber 22 and the fluid passage 18 sufficient to move the tapered surface 61 of the snubber stem 52 into contact with the tapered seat 23 in the cylinder end 16. The tension limiter spring 64 may be compressed for the snubber stem to move into contact. The compression of the spring 64 allows for softer contact between the snubber stem 52 and the cylinder end and prevents damage to the components. With the snubber stem 52 in contact with the cylinder end 16 all exhausted fluid flow from the actuating chamber 22 now must pass through the circular orifice 63 at the minimum flow rate so that retracting movement of the piston rod assembly 14 is quickly decelerated during the last stages of the retracting stroke to slow down the piston rod assembly 14 in a smooth controlled manner so as to alleviate any substantial impact at the end of the stroke movement of the piston rod assembly. By passing all the exhausted fluid through the circular orifice 63 pressure builds up in the actuating chamber and provides the dampening effect. Movement of the piston rod assembly 14 will continue until the piston 25 contacts the cylinder end 16. The spring 53 will compress to allow the additional movement and prevent damage to the snubber stem 52. The springs 53,54 position and also limit forces on the snubber stem 52.

To extend the piston rod assembly 14 fluid is directed through the fluid passage 18 acting on the enlarged flange 60 of the snubber stem 52. The fluid acting on the flange 60 will further compress the spring 53 which allows the snubber stem 52 to move away from the end portion 16 thus allowing unrestricted fluid flow into the actuating chamber 22 to extend the piston rod assembly 14. With the snubber stem being moved to allow free flow into the actuating chamber there is no delay in extending the piston rod assembly.

If a longer dampening zone is required the only changes required are to increase the length of the bore 34, the snubber stem 52 and the spring 53.

In view of the above, it is readily apparent that the structure of the present invention provides an improved snubber assembly effective in decelerating the movement of the piston rod assembly in the last stages of the retracting stroke by restricting fluid flow from the actuating chamber. The snubber assembly will allow unrestricted fluid flow into the actuating chamber for extending the piston rod assembly.

Other aspects, objects and advantages of this invention can be obtained from a study of the drawings, the disclosure and the appended claims.

I claim:

1. A snubber for a hydraulic motor having a cylinder with an actuating chamber adjacent an end of the cylinder having a fluid passage therein for transmitting hydraulic fluid into and out of the actuating chamber, comprising:

a piston rod assembly reciprocatably mounted within the cylinder, the piston rod assembly includes an axial bore formed therein;

a snubber stem reciprocatably disposed within the axial bore of the piston rod assembly and having an end portion extending a predetermined distance into the actuating chamber, the snubber stem has a first operative position wherein the snubber stem is spaced from the end of the cylinder and a second operative position wherein the snubber stem is in contact with the end of the cylinder;

a first spring resiliently biasing the snubber stem toward the end of the cylinder;

a second spring resiliently positioning the snubber stem the predetermined distance into the actuating chamber by resisting the biasing force of the first spring; and a flow restricting passage means in the snubber stem for communicating the actuating chamber with the fluid passage in the end of the cylinder when the snubber stem is in the second operative position to dampen the end of stroke movement of the piston rod assembly.

2. The snubber of claim 1 wherein the snubber stem includes an enlarged flange having the flow restricting passage extending therethrough to restrict flow from the actuating chamber into the fluid passage.

3. The snubber of claim 2 wherein the flow restricting passage means is a circular orifice formed in the enlarged flange of the snubber stem.

4. The snubber of claim 3 wherein the circular orifice axially extends through the enlarged flange.

5. The snubber of claim 1 wherein the piston rod assembly includes a piston rod, a piston, a bolt each having a bore for receiving the snubber stem assembly.

6. The snubber of claim 1 wherein the snubber stem has a stop means attached to the second end portion.

7. The snubber of claim 6 wherein the stop means is a snap ring.

8. The snubber of claim 6 wherein the first spring is positioned around the second end portion of the snubber stem between the stop means and the bore in the piston rod.

9. The snubber of claim 6 wherein the second spring is positioned around the second end portion of the snubber stem between the stop means and the bolt.

* * * * *